United States Patent
Toyoda et al.

(10) Patent No.: US 7,455,562 B2
(45) Date of Patent: Nov. 25, 2008

(54) MATERIAL FOR MANUFACTURING DISPLAY PANEL SUBSTRATE ASSEMBLY AND PROCESS FOR MANUFACTURING DISPLAY PANEL SUBSTRATE ASSEMBLY

(75) Inventors: Osamu Toyoda, Kawasaki (JP); Kazunori Inoue, Kawasaki (JP)

(73) Assignee: Hitachi Plasma Patent Licensing Co., Ltd., Tokyo (JP)

( * ) Notice: Subject to any disclaimer, the term of this patent is extended or adjusted under 35 U.S.C. 154(b) by 876 days.

(21) Appl. No.: 10/968,274

(22) Filed: Oct. 20, 2004

(65) Prior Publication Data

US 2005/0248068 A1  Nov. 10, 2005

(30) Foreign Application Priority Data

May 6, 2004  (JP)  ............... 2004-137691

(51) Int. Cl.
*H01J 9/00*  (2006.01)

(52) U.S. Cl. .......................... 445/23; 156/651

(58) Field of Classification Search ......... 313/582–587; 445/23–25; 156/65
See application file for complete search history.

(56) References Cited

U.S. PATENT DOCUMENTS

2003/0071572 A1  4/2003  Hibino et al.

FOREIGN PATENT DOCUMENTS

| CN | 1320897 | 11/2001 |
| JP | 9-12336 | 1/1997 |
| JP | 2001-84912 | 3/2001 |
| JP | 2001-297691 | 10/2001 |

*Primary Examiner*—Joseph L Williams
(74) *Attorney, Agent, or Firm*—Staas & Halsey LLP (57) ABSTRACT

A material for manufacturing a display panel substrate assembly having at least an electrode and a dielectric layer covering the electrode on a glass substrate, the material including an electrode material containing an electrically conductive particle and a binder resin having a thermal degradation temperature T1, and a dielectric material containing a binder resin having a thermal degradation temperature T2 and a low melting point glass having a glass softening point Tb, wherein the thermal degradation temperatures T1 and T2, and the glass softening point Tb have a relationship of $T2 < T1 < Tb$.

7 Claims, 3 Drawing Sheets

MATERIAL FOR MANUFACTURING DISPLAY PANEL SUBSTRATE ASSEMBLY AND PROCESS FOR MANUFACTURING DISPLAY PANEL SUBSTRATE ASSEMBLY

CROSS-REFERENCE TO RELATED APPLICATION

This application is related to Japanese application No. 2004-137691 filed on May 6, 2004, whose priority is claimed under 35 USC §119, the disclosure of which is incorporated by reference in its entirety.

BACKGROUND OF THE INVENTION

1. Field of the Invention

The present invention relates to a material for manufacturing a display panel substrate assembly and a process for manufacturing a display panel substrate assembly. More particularly, the present invention relates to a material for manufacturing a display panel substrate assembly comprising an electrode and a dielectric layer as a substrate constituent element on a glass substrate, such as a front substrate assembly and a rear substrate assembly of a plasma display panel (PDP), and a process for manufacturing a display panel substrate assembly.

2. Description of the Related Art

PDP known as a display panel is a self-emitting type display panel in which a discharge space is formed in the interior by disposing a pair of substrates (usually a glass substrate) opposite to each other at a slight interval, and sealing the surrounding.

Among PDPs, AC-type PDP is provided with an electrode, a dielectric layer for covering the electrode, and a rib having a height of around 100 to 200 μm for partitioning a discharge space.

As an electrode, an Ag electrode obtained by binding an Ag particle with a low melting point glass is mainly used in many cases. Moreover, the dielectric layer and the rib are made of a low melting point glass material.

The conventional process for manufacturing the electrode, the dielectric layer and the rib, a representative of which is described in Japanese Unexamined Patent Application No. 2001-84912 and Japanese Unexamined Patent Application No. 2001-297691, will be explained below.

As a material for forming the electrode (electrode material), a paste obtained by dispersing an Ag fine particle, a low melting point glass powder, a binder resin, and a filler to be mixed if necessary in a solvent, is used.

This electrode material is coated on a glass substrate by a screen-printing method or the like, and the solvent is volatilized by drying, to form an electrode material layer having a predetermined shape. Alternatively, there is a method of forming the electrode material layer by photolithography using a photosensitive resin as the binder resin.

The electrode is prepared by forming the electrode material layer on the glass substrate and, thereafter, heating the glass substrate from room temperature to a softening point of the low melting point glass contained in the material or higher (around 500 to 600° C.) to degrade the binder resin, and soften, melt and sinter the low melting point glass, whereby, Ag particles are bound and Ag and the glass substrate are bound. This step is termed firing. Alternatively, as the electrode material, there is also a material using a superfine particle of Ag. This material can bind an Ag particle itself by heat even when the low melting point glass powder as a binding material is not mixed therein.

After the electrode is formed on the glass substrate, a low melting point glass powder, a binder resin, and a filler to be mixed if necessary are subsequently dispersed in a solvent to obtain a pasty material for forming a dielectric layer (dielectric material), the material is coated on the glass substrate on which the electrode has been disposed, with a screen-printing method or the like, and the solvent is volatilized by drying to form a dielectric material layer.

After formation of the dielectric material layer, the glass substrate is fired from room temperature to a softening point of the low melting point glass contained in the material or higher (around 500 to 600° C.) to degrade the binder resin, and soften and melt the low melting point glass, whereby, the dielectric layer bound to a glass substrate is formed.

For the glass substrate on which the rib need to be formed, a pasty material for forming a rib (rib material) obtained by dispersing a low melting point glass powder, a binder resin, and a filler to be mixed if necessary in a solvent, is coated on the glass substrate on which the electrode and the dielectric layer have been formed, with a screen-printing method or the like, to a desired thickness. Then, the solvent is volatilized from a coated film by drying, to form a plain film. Thereafter, a mask is patterned with a photosensitive resist such as a dry film, and a part other than a dry film mask pattern is cut with a sand blast, whereby, a rib material layer is formed. Then, the dry film mask pattern is removed, and the glass substrate is fired from room temperature to a softening point of the low melting point glass contained in a rib material layer or higher (around 500 to 600° C.) to degrade the binder resin, and soften and melt a low melting point glass, whereby, the rib bound to the glass substrate is formed.

In addition, regarding the aforementioned dielectric layer and rib, there is also a method of filling each material in a transfer intaglio having a groove serving as a negative shape for the rib and the dielectric layer, volatilizing a solvent, and transferring and forming the dielectric layer and the rib on the glass substrate on which the electrode shape has been formed. Also in this case, after formation of material layers for the dielectric and the rib, there is an unchanged step of firing the glass substrate from room temperature to a softening point of the low melting point glass contained in the material or higher (around 500 to 600° C.) to degrade the binder resin, and soften and melt the low melting point glass, whereby the dielectric layer and the rib bound to a glass substrate are formed.

In the aforementioned conventional manufacturing method, it includes a step of coating the material, a step of drying the solvent, and a step of firing every constituent material, which needs for very much time and energy. If after shapes of all constituent materials are formed, all materials can be densified and bound by one time firing (simultaneous firing) in order to improve these points, a time and energy can be greatly saved.

However, in case of trying to perform simultaneous firing by using the conventional materials as they are, the following problems arise.

In a process for firing the material, the binder resin is fired (degraded), and a gas derived from a binder resin need to be discharged to the outside. However, depending on a combination of materials, when the gas derived from the binder resin is discharged to the outside, if degradation of the binder resin for an other material covering the material has not been initiated, or softening of the low melting point glass has been initiated, the gas derived from the binder resin contained in those materials is enclosed in the interior of the material and, finally, a pressure is elevated, and the material is broken in some times.

SUMMARY OF THE INVENTION

Thus, according to the present invention, there is provided a first material for manufacturing a display panel substrate assembly having at least an electrode and a dielectric layer covering the electrode on a glass substrate, the material comprising an electrode material containing an electrically conductive particle and a binder resin having a thermal degradation temperature T1, and a dielectric material containing a binder resin having a thermal degradation temperature T2 and a low melting point glass having a glass softening point Tb, wherein the thermal degradation temperatures T1 and T2, and the glass softening point Tb have a relationship of T2<T1<Tb.

Also, according to the present invention, there is provided a process for manufacturing a display panel substrate assembly using the aforementioned material for manufacturing a display panel substrate assembly, comprising the steps of:

forming an electrode material layer having a predetermined pattern on a glass substrate using the electrode material, forming a dielectric material layer using the dielectric material so as to cover the electrode material layer, and firing a whole glass substrate to degrade binder resins contained in the electrode material layer and the dielectric material layer, and soften and sinter a low melting point glass, whereby, an electrode and a dielectric layer are formed at the same time by one time firing.

Further, according to the present invention, there is provided a second material for manufacturing a display panel substrate assembly having at least an electrode, an dielectric layer covering the electrode, and a rib formed on the dielectric layer on a glass substrate, material comprising an electrode material containing an electrically conductive particle and a binder resin having a thermal degradation temperature of T1, a dielectric material containing a binder resin having a thermal degradation temperature T2 and a low melting point glass having a glass softening point Tb, and a rib material containing a binder resin having a thermal degradation temperature T3 and a low melting point glass having a glass softening point Tc, wherein the thermal degradation temperatures T1 to T3, and the glass softening points Tb and Tc have a relationship of T3<T2<T1<Tb and T3<Tc.

In addition, according to the present invention, there is provided a process for manufacturing a display panel substrate assembly using the aforementioned material for manufacturing a display panel substrate assembly, comprising:

forming an electrode material layer having a predetermined pattern on a glass substrate using the electrode material, forming a dielectric material layer using the dielectric material so as to cover the electrode material layer, forming a rib material layer on a dielectric material layer using the rib material, and firing a total glass substrate to degrade binder resins contained in the electrode material layer, the dielectric material layer and the rib material layer, and soften and sinter low melting point glasses, whereby, an electrode, a dielectric layer and a rib are formed at the same time by one time firing.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

First, a first material for manufacturing a display panel substrate assembly of the present invention comprises a combination of an electrode material containing an electrically conductive particle and binder resin having a thermal degradation temperature T1, and a dielectric material containing a binder resin having a thermal degradation temperature T2 and a low melting point grass having a grass softening point Tb. Further, the thermal degradation temperatures T1 and T2, and the glass softening point Tb have a relationship of T2<T1<Tb. A thermal degradation temperature means an endothermic peak value measured by a TG/TDA method. In addition, as a glass softening point, a temperature of a fourth inflexion point measured using a macro-type differential thermal analyzer was adopted. When the aforementioned material for manufacturing is used for manufacturing a substrate assembly, an electrode and a dielectric layer can be formed by one time firing at the same time. In the case where the aforementioned relationship is not satisfied, when an electrode and a dielectric layer are formed by one time firing at the same time, a gas derived from the binder resin remains in the electrode and/or dielectric layer, or breaks the electrode and/or dielectric layer, whereby, each property is deteriorated in some cases.

Herein, a difference in temperatures T2, T1 and Tb is preferably in a range of 20 to 50° C. By using the binder resin and the low melting point glass in this range, remaining of a gas can be suppressed better.

In addition, the electrode material may further contain a low melting point glass having a glass softening point Ta. By inclusion of a low melting point glass, the electrode can be adhered on a glass substrate better. Herein, the aforementioned thermal degradation temperature T1, thermal degradation temperature T2 and the glass softening point Ta have preferably a relationship of T2<T1<Ta. By using the binder resin and the low melting point glass having this relationship, remaining of a gas can be suppressed better. Herein, a difference in temperatures T1 and Ta is preferably in a range of 20 to 50° C. By using the binder resin and the low melting point glass in this range, remaining of a gas can be suppressed better.

Further, it is better that glass softening points Ta and Tb have a relationship of Ta<Tb. By having this relationship, the electrically conductive particle constructing the electrode material can be suppressed from diffusing into the dielectric layer. It is preferable that a difference in temperatures Ta and Tb is in a range of 20 to 50° C. By using low melting point glasses in this range, the electrically conductive particle constituting the electrode material can be suppressed from diffusing into the dielectric layer better.

In addition, the dielectric material may serves also as a rib material. When the dielectric material serves also as the rib material, not only the electrode and the dielectric layer, but also a rib can be formed by one time firing at the same time.

The electrically conductive particle contained in the electrode material is not particularly limited, but any of the materials which are known in the art can be used. Specific examples include metals such as silver, gold, platinum, palladium, aluminum, and copper, and alloys of these metals. It is preferable that a particle diameter is 0.02 to 6 µm. A particle diameter is an average particle diameter measured by a laser diffraction scattering method or a method of directly observing a diameter with an electron microscope.

Then, the binder resin contained in the electrode material is not particularly limited, but any of the materials which are known in the art can be used. Specifically, examples include a cellulose-based resin, an acrylic-based resin and the like. Examples of the cellulose-based resin include ethylcellulose, nitrocellulose and the like.

Examples of the acrylic-based resin include resins derived from (meth)acrylic-based monomers such as methyl(meth)acrylate, ethyl (meth)acrylate, n-propyl(meth)acrylate, isopropyl(meth)acrylate, n-butyl(meth)acrylate, sec-butyl (meth)acryalte, isobutyl(meth)acrylate, tert-butyl(meth) acrylate, n-pentyl(meth)acrylate, allyl(meth)acrylate, benzyl (meth)acrylate, butoxyethyl(meth)acrylate, butoxytriethylene glycol (meth)acrylate, cyclohexyl(meth)acrylate, dicyclopentanyl (meth)acrylate, dicyclopentenyl (meth)acrylate, 2-ethylhexyl (meth)acrylate, glycerol (meth) acrylate, glycidyl(meth)acrylate, heptadecafluorodecyl (meth)acrylate, 2-hydroxyethyl(meth)acrylate, isobonyl (meth)acrylate, 2-hydroxypropyl(meth)acrylate, isodexyl (meth)acrylate, isooctyl(meth)acrylate, lauryl(meth)acrylate, 2-methoxyethyl(meth)acryalte, methoxy ethylene glycol (meth)acrylate, methoxydiethylene glycol (meth)acrylate, octafluoropentyl(meth)acrylate, phenoxyethyl(meth)acrylate, stearyl(meth)acrylate, trifluoroethyl (meth)acrylate, (meth)acrylamide, aminoethyl(meth)acrylate, phenyl (meth)acrylate, phenoxyethyl(meth)acrylate, 1-naphthyl(meth) acrylate, 2-naphthyl(meth)acrylate, thiophenol (meth)acrylate, benzylmercaptan (meth)acrylate and the like, and polyfunctional monomers such as acrylated cyclohexyl di(meth)acrylate, 1,4-butanediol (meth)acrylate, 1,3-butylene glycol (meth)acrylate, ethylene glycol di(meth)acrylate, diethylene glycol di(meth)acrylate, triethylene glycol di(meth)acrylate, polyethylene glycol di(meth)acrylate, dipentaerythritol hexa(meth)acrylate, dipentaerythritol monohydroxypenta(meth)acrylate, ditrimethylolpropane tetra(meth)acrylate, glycerol di(meth)acrylate, methoxylated cyclohexyl di(meth)acrylate, neopentyl glycol di(meth)acrylate, propylene glycol di(meth)acrylate, polypropylene glycol (meth)acrylate, triglycerol di(meth)acrylate, trimethylolpropane tri(meth)acrylate, bisphenol A di(meth)acrylate, di(meth)acrylate of bisphenol A-ethylene oxide adduct, di(meth)diacrylate of bisphenol A-propylene oxide adduct. (Meth)acrylate means methacrylate or acrylate.

Further, resins derived from vinyl-based monomers such as styrene, p-methylstyrene, o-methylstyrene, m-methylstyrene, α-methylstyrene, chloromethylstyrene, hydroxymethylstyrene, γ-methacryloxypropyltrimethoxysilane, 1-vinyl-2-pyrrolidone and the like may be mixed into the aforementioned acrylic-based resins. Further, these vinyl-based monomers may be used as a copolymerization component of acrylic-based resins.

The electrode material may contain the low melting glass. Examples of the low melting glass include lead oxide glasses (comprising lead oxide, boron oxide, silicon oxide, aluminum oxide etc.), bismuth oxide glasses (comprising bismuth oxide, zinc oxide, boron oxide, calcium oxide etc.) and the like. Further, the electrode material may contain an alkali such as sodium, potassium and the like, and a heat-resistant oxide (filler or pigment). Adjustment of a glass softening point of the low melting point glass can be performed by adjusting a composition ratio of components, and an amount of an alkali to be added.

In addition, the electrode material may contain a solvent such as butylcarbitol acetate (BCA), terpineol and the like. Further, formulation of making the aforementioned acrylic-based monomer and a photopolymerization initiator, and polymerizing with the binder resin by ultraviolet irradiation before firing, to cure the electrode material may be adopted. Examples of the photopolymerization initiator include 2-benzyl-2-dimethylamino-1-(4-morpholinophenyl)-butane-1, bis (2,4,6-trimethylbenzoyl)-phenylphosphine oxide, 2-methyl-1[4-(methylthio)phenyl]-2-morpholinopropane-1,2,4-diethylthioxanthone and the like.

Then, as the binder resin contained in the dielectric material, any of binder resins described for explanation of the electric material can be used as far as they have a temperature relationship of $T2<T1$.

In addition, as the low melting point glass contained in dielectric material, any of low melting point glasses described for explanation of the electrode material can be used as far as they have a temperature relationship of $T1<Ta$.

Further, as in the aforementioned electrode material, the dielectric material may contain an alkali, a heat-resistant oxide, a solvent, an acrylic-based monomer, and a photopolymerization initiator.

Herein, even when the dielectric material serves also as the rib material, the aforementioned binder resin and low melting point glass can be used.

Then, a second material for manufacturing a display panel substrate assembly of the present invention comprises a combination of an electrode material containing an electrically conductive particle and a binder resin having a thermal degradation temperature $T1$, a dielectric material containing a binder resin having a thermal degradation temperature $T2$ and a low melting point glass having a glass softening point $Tb$, and a rib material containing a binder resin having a thermal degradation temperature $T3$ and a low melting point glass having a glass softening point $Tc$. Further, thermal degradation temperatures $T1$ to $T3$, and glass softening points $Tb$ and $Tc$ of the material has a relationship of $T3<T2<T1<Tb$ and $T3<Tc$.

When the aforementioned material for manufacturing is used for manufacturing a substrate assembly, an electrode, a dielectric layer and a rib can be formed by one time firing at the same time. In the case where the aforementioned relationship is not satisfied, when the electrode, the dielectric layer and the rib are formed by one time firing at the same time, a gas derived from the binder resin remains in the electrode, the dielectric layer and/or the rib, or brakes the electrode, the dielectric layer and/or the rib, whereby, each property is deteriorated in some cases.

Herein, it is preferable that a difference in temperatures $T3$, $T2$, $T1$, $Tc$ and $Tb$ is in a range of 20 to 50° C. By using the binder resin and a low melting point glass in this range, remaining of a gas can be suppressed better.

In addition, the electrode material may further contain a low melting point glass having a glass softening point $Ta$. By inclusion of a low melting point glass, the electrode can be adhered on a glass substrate better. Herein, it is preferable that the aforementioned thermal degradation temperature $T1$, thermal degradation temperature $T2$ and glass softening point $Ta$ have a relationship of $T2<T1<Ta$. By using the binder resin and the low melting point glass having this relationship, remaining of a gas can be suppressed better. Herein, it is preferable that a difference in temperatures $T1$ and $Ta$ is in a range of 20 to 50° C. By using the binder resin and the low melting point glass in this range, remaining of a gas can be suppressed better.

Further, it is preferable that glass-softening points Ta and Tb have a relationship of Ta<Tb. By this relationship, the electrically conductive particle constituting the electrode material can be suppressed from diffusing into the dielectric layer. It is preferable that a difference in temperatures Ta and Tb is in a range of 20 to 50° C. By using the low melting point glass in this range, the electrically conductive particle constituting the electrode material can be suppressed better from diffusing into the dielectric layer.

As a binder resin and the low melting point glass contained in the electrode material, the dielectric material and the rib material, the same materials as those in the aforementioned first material for manufacturing can be used as far as they have a specified temperature relationship.

A process for manufacturing a display panel substrate assembly using the first material for manufacturing will be explained below.

First, using the electrode material, an electrode material layer having a predetermined pattern is formed on the glass substrate, for example, by a screen-printing method or a roll coating method. A thickness of the electrode material layer is adjusted so that the electrode having a predetermined thickness is obtained after firing.

Then, using the dielectric material, a dielectric material layer is formed, for example, by a screen-printing method or a roll coating method so as to cover the electrode material layer. A thickness of the dielectric material layer is adjusted so that the dielectric layer having a prescribed thickness is obtained after firing.

Thereafter, by firing a total glass substrate, binder resins contained in each material layer of the electrode and the dielectric are degraded, and the low melting glass is softened and sintered, whereby, the electrode and the dielectric layer are formed by one time firing at the same time.

Herein, it is preferable that firing is performed under such the condition that the substrate is retained at a temperature corresponding to the thermal degradation temperature of binder resins and a glass softening point of the low melting point glass contained in the material for manufacturing for a predetermined time. By performing firing under such the condition, degradation of the binder resin and melting of the low melting point glass are more assuredly performed.

Further, when the dielectric material serves also as the rib material in the first material for manufacturing, the substrate assembly for the display panel can be manufactured as follows:

First, a step of forming the electrode material layer on the glass substrate using the electrode material is the same as that in the aforementioned process.

Then, a groove of a transfer substrate having a groove corresponding to shapes of the rib and the dielectric layer is filled with a rib material serving also as a dielectric. The transfer substrate is not particularly limited as far as a predetermined groove can be formed.

Further, the rib material serving also as a dielectric which has been filled from a transfer substrate is transferred onto the glass substrate on which the electrode material layer has been formed. By transferring, a rib material layer serving also as a dielectric is formed.

Thereafter, by firing a total glass substrate, binder resins contained in the electrode material layer, and the rib material layer serving also as a dielectric are degraded, and the low melting point glass is softened and sintered, whereby, the electrode, the dielectric layer and the rib can be formed by one time firing at the same time. Also in this process, as in the aforementioned process, firing is preferably performed under such the condition that the substrate is retained at a temperature corresponding to thermal degradation temperatures of binder resins and a glass softening point of the low melting point glass contained in a material for manufacturing for a predetermined time.

Then, a process for manufacturing a display panel substrate assembly using the second material for manufacturing will be explained.

First, a step of forming an electrode material layer and a dielectric material layer is the same as that using the aforementioned first material for manufacturing.

Then, using the rib material, a rib material layer is formed on the dielectric material layer.

Thereafter, by firing a total glass substrate, binder resins are degraded, and low melting point glasses contained in each of the electrode material layer, the dielectric material layer and the rib material layer are softened and sintered, whereby, the electrode, the dielectric layer and the rib are formed by one time firing at the same time. Also in this process, as in the aforementioned process, firing is preferably performed under such the condition that the substrate is retained at a temperature corresponding to a thermal degradation temperature of binder resins and a glass softening point of low melting point glasses contained in a material for manufacturing for a predetermined time.

The material for manufacturing of the present invention can be used in a display panel such as PDP. An example using the material for manufacturing of the present invention in manufacturing PDP in FIG. 1 will be described below.

Figure 1:
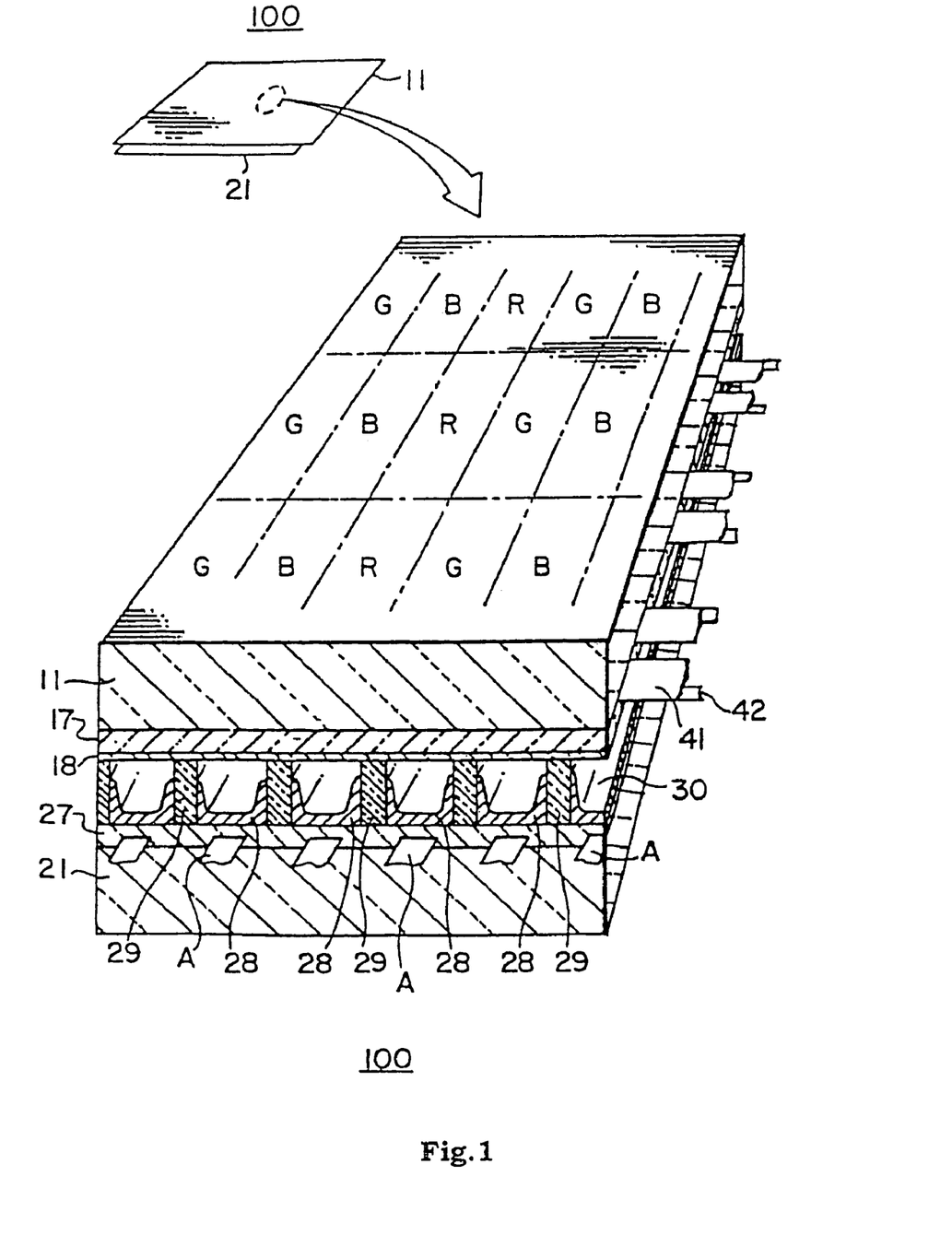
FIG. 1 is a schematic perspective view of a PDP.

PDP of FIG. 1 is three electrode AC-type surface discharge PDP. The present invention can be applied to not only this PDP, but also any construction. For example, not only AC type but also DC type may be used, and the present invention may be used in PDP of reflection type and transmission type.

PDP 100 of FIG. 1 is constructed of a front substrate assembly and a rear substrate assembly.

First, the front substrate assembly is generally composed of a plurality of display electrodes formed on a glass substrate 11, a dielectric layer 17 formed so as to cover the display electrode, and a protecting layer 18 which is formed on the dielectric layer 17 and is exposed in a discharge space.

The material for manufacturing of the present invention can be used for manufacturing the display electrode and the dielectric layer of this front substrate assembly.

The protecting layer 18 is provided for protecting the dielectric layer 17 against damage due to collision of ions generated by discharge upon display. The protecting layer 18 is composed, for example, of MgO, CaO, SrO, BaO and the like.

Then, the rear substrate assembly is generally composed of a plurality of address electrodes A formed in a direction so that the electrode crosses with the aforementioned display electrode, on a glass substrate 21, a dielectric layer 27 covering an address electrode A, a plurality of stripe-like ribs 29 formed on the dielectric layer 27 between adjacent address electrodes A, and a phosphor layer 28 formed including a wall surface between ribs 29.

The material for manufacturing of the present invention can be used for manufacturing the address electrode, the dielectric layer and the rib of this rear substrate assembly.

Then, the front substrate assembly and the rear substrate assembly are disposed opposite to each other with both electrodes on are crossed at a right angle and a space surrounded by the rib 29 is filled with a discharge gas, whereby, PDP 100 can be formed.

The present invention will be further explained in detail by specific embodiment.

Embodiment 1

An embodiment 1 will be explained using FIG. 2.

Figure 2:
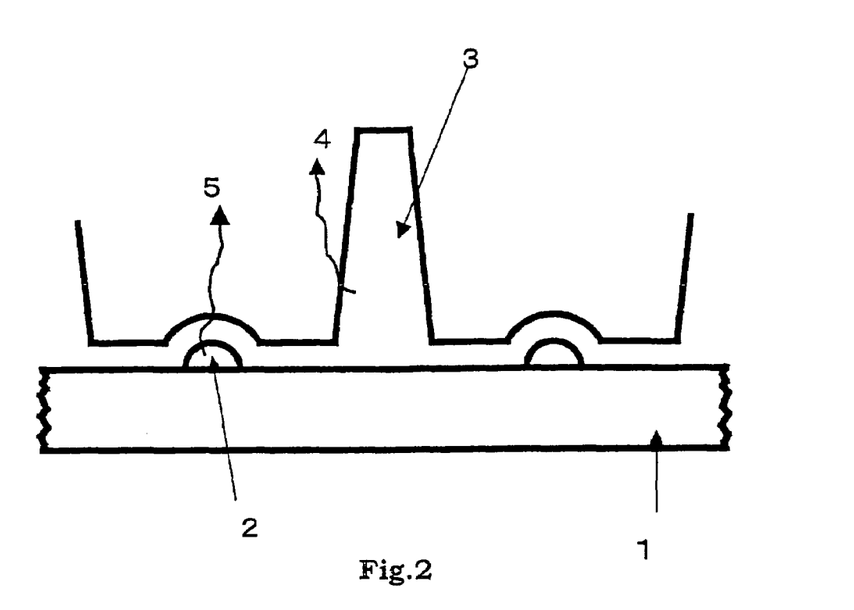
FIG. 2 is an explanatory schematic view of a process for manufacturing rear substrate assembly of the Embodiment 1.

A layered construction depicted in FIG. 2 is an electrode material layer 2 and a rib material layer serving also as a dielectric 3 formed on a glass substrate 1. The electrode material layer 2 constructed of an electrode material composed of an electrically conductive particle, a binder resin having a thermal degradation temperature T1, and a low melting point glass powder having a glass softening point Ta. The rib material layer serving also as a dielectric 3 is constructed of a rib material serving also as a dielectric composed of a binder resin having a thermal degradation temperature T2, a low melting point glass powder having a glass softening point Tb, and a filler powder which is mixed therein if necessary.

A thermal degradation temperature and a glass softening point of the above mentioned each material are set so that they are T2<T1<Tb and Ta. For example, they can be set as follows: T2=300 to 350° C., T1=350 to 400° C., Tb=450° C., Ta=500° C.

In addition, adjustment of a thermal degradation temperature of the binder resin can be performed by a molecular weight and a resin amount of a polymer to be used, and a kind of a resin. Specifically, generally, as a molecular weight grows smaller and a resin amount grows smaller, a thermal degradation temperature is lowered. In addition, when a photocurable resin (e.g. mixture of oligomer, monomer and photopolymerization initiator) is used in the binder resin, a thermal degradation temperature can be lowered by adjusting the number of functional groups and adjusting an amount of the photopolymerization initiator to be added to lower a polymerization degree and a crosslinking density.

One example of the electrode material and the rib material serving also as a dielectric is described below. In addition, by using a vehicle in which the binder resin is dissolved in a solvent, each material is made to be pasty.

A. Electrode Material (T1=400° C., Ta=500° C.)

(1) Electrically Conductive Particle: Silver, Gold, Platinum, Palladium, Aluminum, Copper, Alloy Thereof Etc.

Particle diameter: around 0.02 to 6 μmφ

(2) Low Melting Point Glass (Ta=500° C.)

Lead oxide glass (mixture of lead oxide, boron oxide, silicon oxide, aluminum oxide etc.)

Bismuth oxide glass (mixture of bismuth oxide, zinc oxide, boron oxide, calcium oxide etc.)

A miner amount of an alkali may be added to a low melting point glass. In addition, in order to adjust flowability, a heat-resistant oxide (filler or pigment) may be added. When the heat-resistant oxide is added, a weight mixing ratio of the low melting point glass and the heat-resistant oxide is desirably around 60 to 100:40 to 0.

A glass softening point (Ta) can be regulated by a composition of the low melting point glass and an amount of an alkali to be added.

(3) Vehicle (Containing Binder Resin of T1=400° C.)

(a) Binder resin+solvent: solution containing 10 to 40 wt % binder resin, or (b) Binder resin (oligomer)+monomer+photopolymerization initiator Example of (a)

Ethylcellulose (weight average molecular weight 200000 to 300000)+BCA, terpineol Acrylic resin (weight average molecular weight 400000 to 500000)+BCA, terpineol Example of (b)

Acrylic-based copolymer+methacrylic acid monomer+photopolymerization initiator (weight ratio 1 to 2:2 to 3:0.2 to 0.3)

(4) Composition of Electrode Material

Electrically conductive particle: low melting point glass: vehicle=70 to 90:1 to 5:29 to 5 (weight ratio)

B. Rib Material Serving Also as Dielectric (t2=350° C., Tb=450° C.)

(1) Low Melting Point Glass (Tb=450° C.)

Lead oxide glass (mixture of lead oxide, boron oxide, silicon oxide, aluminum oxide etc.)

Bismuth oxide glass (mixture of bismuth oxide, zinc oxide, boron oxide, calcium oxide etc.)

A minor amount of an alkali may be added to a low melting point glass. In addition, in order to adjust flowability, a heat-resistant oxide (filler or pigment) may be added. When the heat-resistant oxide is added, a weight mixing ratio of the low melting point glass and the heat-resistant is desirably around 60 to 100:40 to 0.

A glass softening point (Tb) can be regulated by a composition of the low melting point of glass and an amount of alkali to be added.

(2) Vehicle (Containing Binder Resin of T2=350° C.)

(a) Binder resin+solvent: solution containing 5 to 20 wt % binder resin, or (b) binder resin (oligomer)+monomer+photopolymerizaiton initiator Example of (a)

Ethylcellulose (weight average molecular weight 50000 to 100000)+BCA, terpineol

Acrylic resin (weight average molecular weight 400000 to 500000)+BCA, terpineol

Examples of (b)

Acrylic-based copolymer+methacrylic acid monomer+photopolymerization initiator (weight ratio 1 to 2:1 to 2:0.1 to 0.2)

(4) Composition of Rib Material Serving Also as a Dielectric

Low melting point glass: vehicle=70 to 90:30 to 10 (weight ratio)

A process for manufacturing a layered construction of FIG. 2 will be described below.

First, a pasty electrode material is printed on the glass substrate 1 to form the electrode material layer 2 having an electrode pattern shape.

Then, after a pasty rib material serving also as a dielectric was filled in a separately prepared transfer intaglio having a groove of a negative shape for a rib and a dielectric layer, the rib material serving also as a dielectric was transferred on the glass substrate 1 on which the aforementioned electrode material layer 2 had been formed, to form the rib material layer serving also as a dielectric 3. As transference, any of a method of utilizing tackiness of a binder resin itself contained in the rib material serving also as a dielectric and a method of transference performed by UV curing using a UV-curable binder resin may be used.

A temperature of the material layer (2 and 3) formed on the glass substrate 1 like this is gradually raised from room temperature to around 500° C. Upon rise in a temperature, a temperature raising profile of fixing a temperature at desirably a thermal degradation temperature of binder resins (300° C., 350° C.), and a softening point of low melting point glasses (450° C., 500° C.) for 10 to 15 minutes is desirable.

When a substrate temperature is raised and approaches around 300° C., the binder resin contained in the rib material layer serving also as a dielectric 3 is initiated to be degraded, and the binder resin is released to the outside (reference No. 4 in the figure). Subsequently, when a temperature approaches around 350° C., the binder resin contained in the electrode material layer 2 is initiated to be degraded. At this time, in the interior of the rib material layer serving also as a dielectric 3 covering the electrode material layer 2, the binder resin has been degraded and is not present, and only powdery low melting point glasses before initiation of softening are present. For this reason, when the binder resin contained in the electrode material layer is degraded into a gas, this is discharged through the interior of the rib material layer serving also as a dielectric 3, and is discharged to the outside (reference No. 5 in the figure).

When a temperature is further raised, and approaches around 450° C., the low melting point glass contained in the rib material layer serving also as a dielectric and, when a temperature approaches around 500° C., the low melting point glass contained in the electrode material layer are each softened, melted and sintered to vitrify, thereby, the electrode, the dielectric layer and the rib which are adhered, are formed. Upon softening of the low melting point glass, since the binder resin is not preset, a gas is not fundamentally evolved. Therefore, a relationship of softening points between low melting point glasses may be reverse to this example, or may be the same.

Although in this Example, the electrode, the dielectric layer and the rib were formed using the electrode material and a rib material serving also as a dielectric, only the electrode and the dielectric layer may be formed without forming the rib. Further, examples of a method of forming the dielectric layer include a screen-printing method in addition to the aforementioned transfer method.

Embodiment 2

Figure 3:
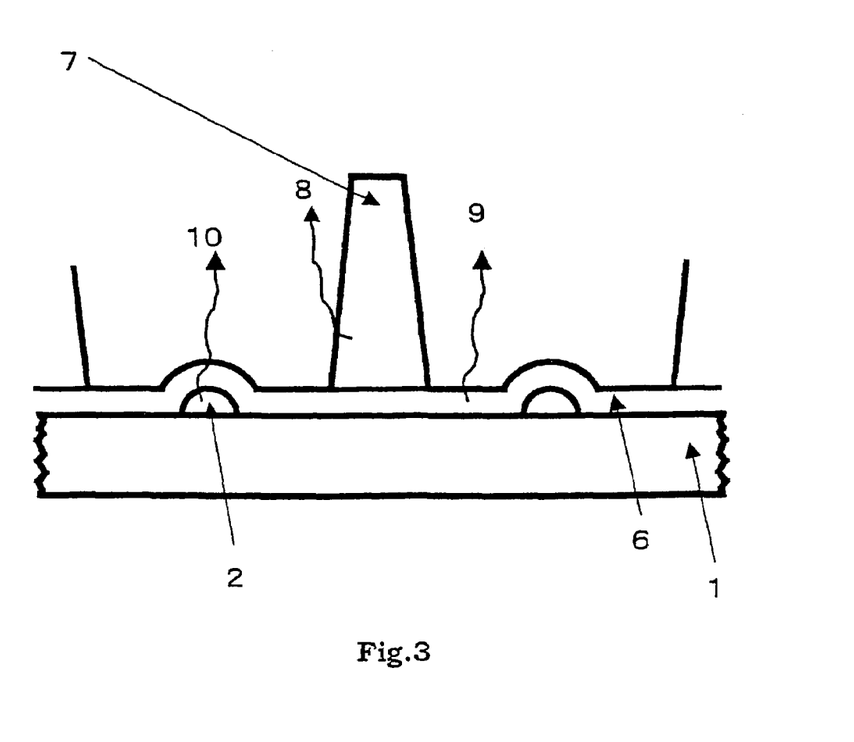
FIG. 3 is an explanatory schematic view of a process for manufacturing rear substrate assembly of the Embodiment 2.

An embodiment 2 will be explained using FIG. 3. A layered construction depicted in FIG. 3 is an electrode material layer 2, a dielectric material layer 6 and a rib material layer 7 formed on a glass substrate 1. The electrode material layer 2 is constructed of an electrode material composed of an electrically conductive particle, a binder resin bind having a thermal degradation temperature T1 and a low melting point glass powder having a glass softening point Ta. The dielectric material layer 6 is constructed of a dielectric material composed of a binder resin having a thermal degradation temperature T2, a low melting point glass powder having a glass softening point Tb, and a filler powder which is mixed therein if necessary. The rib material layer 7 is constructed of a rib material composed a binder resin having a thermal degradation temperature T3, a low melting point glass powder having a glass softening point Tc, and a filler powder which is mixed therein if necessary.

Thermal degradation temperatures and glass softening points of the aforementioned respective materials are set be $T3<T2<T1<Tb$ and Ta, and at least $T3<Tc$. For example, they can be set to be $T3=300°$ C., $T2a=350°$ C., $T1=40°$ C., $Tb=450°$ C., $Tc=500°$ C., and $Ta=550°$ C.

Adjustment of a thermal degradation temperature of the binder resin can be performed as in the embodiment 1.

One example of the electrode material, the dielectric material and the rib material will be described below. By using a vehicle in which the binder resin is dissolved in a solvent, each material is maid to be pasty.

A. Electrode Material ($T1=400°$ C., $Ta=500°$ C.)
(1) Electrically Conductive Particle: Silver, Gold, Platinum, Palladium, Aluminum, Copper, Alloy Thereof, Etc.

Particle diameter: around 0.02 to 6 μmφ
(2) Low Melting Point Glass ($Ta=500°$ C.)
Lead oxide glass (mixture of lead oxide, boron oxide, silicon oxide, aluminum oxide, etc.)
Bismuth oxide glass (mixture of bismuth oxide, zinc oxide, boron oxide, calcium oxide, etc.)

A minor amount of an alkali may be added to a low melting point glass. In addition, in order to adjust flowability, a heat-resistant oxide (filler or pigment) may be added. When the heat-resistant oxide is added, it is desirable that a weight mixing ratio of the low melting point glass and the heat-resistant oxide is around 60 to 100:40 to 0.

A glass softening point (Ta) can be regulated by a composition of the low melting point glass and an amount of an alkali to be added.

(3) Vehicle (Containing a Binder Resin Having $T1=400°$ C.)
(a) Binder resin+solvent: solution containing 10 to 40 wt % binder resin, or (b) binder resin (oligomer)+monomer+photopolymerization initiator Example of (a)
Ethylcellulose (weight average molecular weight 200000 to 300000)+BCA, terpineol
Acrylic resin (weight average molecular weight 400000 to 500000)+BCA, terpineol Example of (b)
Acrylic-based copolymer+methacrylic acid monomer+photopolymerization initiator (weight ratio 1 to 2:2 to 3:0.2 to 0.3)

(4) Composition of Electrode Material
Electrical conductive particle: low melting point glass: vehicle=70 to 90:1 to 5:29-5 (weight ratio)

B. Dielectric Material ($T2=350°$ C., $Tb=450°$ C.)
(1) Low Melting Point Glass ($Tb=450°$ C.)
Lead oxide glass (mixture of lead oxide, boron oxide, silicon oxide, aluminum oxide, etc.)
Bismuth oxide glass (mixture of bismuth oxide, zinc oxide, boron oxide, calcium oxide, etc.)

A minor amount of an alkali may be added to a low melting point glass. In addition, in order to adjust flowability, a heat-resistant oxide (filler or pigment) may be added. When the heat-resistant oxide is added, it is desirable that a weight mixing ratio of the low melting point glass and the heat resistant oxide is around 60 to 100:40 to 0.

A glass softening point (Tb) can be regulated by a composition of the low melting point glass and an amount of an alkali to be added.

(2) Vehicle (Containing Binder Resin of $T2=350°$ C.)
(a) Binder resin+solvent: solution containing 5 to 20 wt % binder resin, or (b) binder resin (oligomer)+monomer+photopolymerization initiator Example of (a)
Ehtylcellurose (weight average molecular weight 50000 to 100000)+BCA, terpineol
Acrylic resin (weight average molecular weight 400000 to 500000)+BCA, terpineol.

Example of (b)
Acrylic-based copolymer+methacrylic acid monomer+photopolymerization initiator (weight ratio 1 to 2:1 to 2:0.1 to 0.2)

(4) Composition of Dielectric Material
Low melting point glass: vehicle=70 to 90:30 to 10 (weight ratio)

C. Rib Material (T3=300° C., Tc=500° C.)
  (1) Low Melting Point Glass (Tb=500° C.)
    Lead oxide glass (mixture of lead oxide, boron oxide, silicon oxide, aluminum oxide etc.
    Bismuth oxide glass (mixture of bismuth oxide, zinc oxide, boron oxide, calcium, etc.)
  A minor amount of an alkali may be added to a low melting point glass. In addition, in order to adjust flowability a heat-resistant oxide (filler or pigment) may be added. When the heat-resistant oxide is added, it is desirable that a weight mixing ratio of the low melting point glass and the heat-resistant oxide a 60 to 100:40 to 0.
  A glass softening point (Tb) can be regulated by a composition of a low melting point glass and an amount of an alkali to be added.
  (2) Vehicle (Containing Binder Resin of T3=300° C.).
  (a) Binder resin+solvent: solution containing 5 to 20 wt % binder resin, or (b) binder resin (oligomer)+monomer+photopolymerization initiator
    Example of (a)
    Ethylcellulose (weight average molecular weight 20000 to 30000)+BCA, terpineol
    Acrylic resin (weight average molecular weight 20000 to 30000)+BCA, terpineol
    Example of (b)
    Acrylic-based copolymer+methacrylic acid monomer+photopolymerization initiator (weight ratio 1 to 2:0.5 to 1:0.01 to 0.1)
  (4) Composition of Dielectric Material
  Low melting point glass: vehicle=70 to 90:30 to 10 (weight ratio)
  A process for manufacturing a layered construction of FIG. 3 will be described below:
  First, a pasty electrode material is printed on the glass substrate 1 by a screen-printing method to form the electrode material layer 2 having an electrode pattern shape.
  Subsequently, a pasty dielectric material is printed by a screen-printing method to form the dielectric material layer 6 and, thereafter, a rib material is coated on a whole surface to form a plain film.
  Thereafter, a photosensitive resist such as a dry film is patterned to form a mask, and a plain film of a part which is not covered with a mask is cut using a sand blast to form the rib material layer 7. After formation of the rib material layer 7, the mask is removed. In addition to a method of forming the rib material layer by a sand blast, a method of forming a plain film using a binder resin contained in a rib material as a photosensitive resin, and forming a rib material layer by exposure and development may be adopted.
  A temperature of each material layer (2, 6 and 7) formed on a glass substrate 1 as described above is gradually raised from room temperature to around 550° C. Upon elevation of a temperature raising profile of fixing a temperature at desirably thermal degradation temperatures (300° C., 350° C., 400° C.) of binder resins, and softening points (450° C., 500° C., 550° C.) of low melting point glasses for 10 to 15 minutes is desirable.
  When a substrate temperature is raised and approaches around 300° C., the binder resin contained in the rib material layer is initiated to be degraded into a gas, and the binder resin is discharged to the outside (reference No. 8 in the figure). Subsequently, when a temperature approaches around 350° C., the binder resin contained in the dielectric material layer 6 is initiated to be degraded. At this point, in the interior of the rib material layer 7, the binder resin has been degraded, and is not present, and only a powdery low melting point glass before initiation of softening is present. For this reason, when the binder resin contained in the dielectric material layer 6 is degraded into a gas, at a region covered with the rib material layer 7, the gas permeates through the interior thereof and, at a not covered region, the gas is discharged as it is to the outside.
  When a temperature approaches around 400° C., the binder resin contained in the electrode layer 2 is degraded, and permeates through each material layer (6 and 7) of a dielectric and a rib for the same reason as that of the dielectric material, and the binder resin is discharged to the outside.
  When a temperature is further raised, and approaches around 450° C., the low melting point glass contained in the dielectric material layer, when a temperature approaches 500° C., the low melting point glass contained in the rib material layer and, when a temperature approaches 550° C., the low melting point glass contained in the electrode material layer are each softened, melted and sintered to vitrify, whereby, an electrode, a dielectric layer and a rib which are adhered, can be formed. Upon softening of low melting point glasses, since binder resins are not present, a gas is not fundamentally evolved. Therefore, a relationship of softening points between low melting point glasses may be reverse to this example, or may be the same.

Embodiment 3

In the aforementioned embodiments 1 and 2, an example using the material for manufacturing of the present invention in a rear substrate assembly of a display panel was shown, but an example using a front substrate assembly will be shown below.

An embodiment 3 will be explained using FIG. 4.

Figure 4:
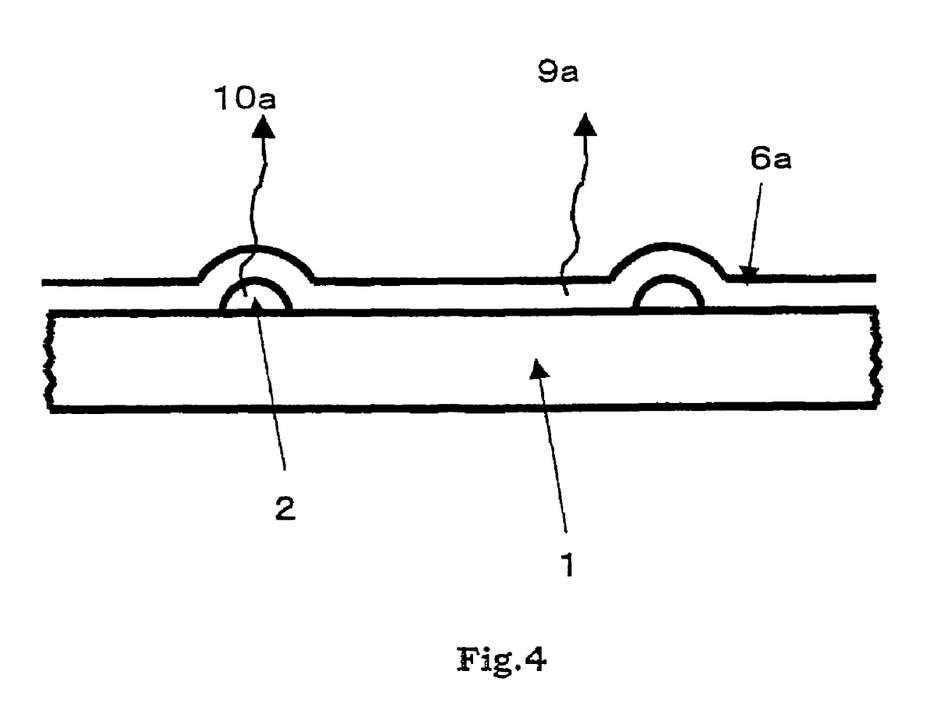
FIG. 4 is an explanatory schematic view of a process for manufacturing front substrate assembly of the Embodiment 3.

A layered construction depicted in FIG. 4 is an electrode material layer 2 and a dielectric material layer 6 formed on a glass substrate 1. The electrode material layer 2 is constructed of an electrode material composed of an electrically conductive particle, a binder resin having a thermal degradation temperature T1, and a low melting point glass powder having a glass softening point Ta. The dielectric material layer 6 is constructed of a dielectric material composed of a binder resin having a thermal degradation temperature T2, a low melting point glass powder having a glass softening point Tb, and a filler powder which is mixed therein if necessary.

Thermal degradation temperatures and glass softening points of the aforementioned respective materials are set to be T2<T1<Tb and Ta. For example, they can be set to be T2=300 to 350° C., T1=350 to 400° C., Tb=450° C., and Ta=500° C.

Adjustment of a thermal degradation temperature of a binder resin can be performed as in the embodiment 1.

One example of the electrode material and the dielectric material will be described below. By using a vehicle, in which a binder resin is dissolved in a solvent, each material is made to be pasty.

A. Electrode Material (T1=400° C., Ta=500° C.)
  (1) Electrically Conductive Particle: Silver, Gold, Platinum, Palladium, Aluminum, Copper, Alloy Thereof Etc.
    Particle size: around 0.02 to 6 μmφ
  (2) Low Melting Point Glass (Ta=500° C.)
    Lead oxide glass (mixture of lead oxide, boron oxide, silicon oxide, aluminum oxide etc.)
    Bismuth oxide glass (mixture of bismuth oxide, zinc oxide, boron oxide, calcium oxide etc.)
  A minor amount of an alkali may be added to a low melting point glass. In addition, in order to adjust flowability, a heat-resistant-oxide (filler or pigment) may be added. When the heat-resistant oxide is added, it is desirable that a weight mixing ratio of the low melting point glass and the heat-resistant oxide is around 60 to 100:40 to 0.

A glass softening point (Ta) can be regulated by a composition of a low melting point glass and an amount of an alkali to be added.

(3) Vehicle (Containing Binder Resin of T1=400° C.)

(a) Binder resin+solvent: solution containing 10 to 40 wt % binder resin, or (b) binder resin (oligomer)+monomer+photopolymerization initiator Example of (a)

Ethylcellulose (weight average molecular weight 200000 to 300000)+BCA, terpineol Acrylic resin (weight average molecular weight 400000 to 500000)+BCA, terpineol Example of (b)

Acrylic-based copolymer+methacrylic acid monomer+photopolymerizaiton initiator (weight ratio 1 to 2:2 to 3:0.2 to 0.3)

(4) Composition of Electrode Material

Electrically conductive particle: low melting point glass: vehicle=70 to 90:1 to 5:29 to 5 (weight ratio)

B. Dielectric Material (T2=350° C., Tb=450° C.)

(1) Low Melting Point Glass (Tb=450° C.)

Lead oxide glass (mixture of lead oxide, boron oxide, silicone oxide, aluminum oxide etc.)

Bismuth oxide glass (mixture of bismuth oxide, zinc oxide boron oxide, calcium oxide etc.)

A minor amount of an alkali may be added to a low melting point glass. In addition, in order to adjust flowability, a heat-resistant oxide (filler or pigment) may be added. When the heat-resistant oxide is added, a weight mixing ratio of the low melting point glass and the heat-resistant oxide is desirably around 60 to 100:40 to 0.

A glass softening point (Tb) can be degraded by a composition of a low melting point glass and an amount of an alkali to be added.

(2) Vehicle (Containing Binder Resin of T2=350° C.)

(a) Binder resin+solvent: solution containing 5 to 20 wt % binder resin, or (b) binder resin (oligomer)+monomer+photopolymerization initiator Example of (a)

Ethylcellulose (weight average molecular weight 50000 to 100000)+BCA, terpineol

Acrylic resin (weight average molecular weight 400000 to 500000)+BCA terpinelol

Example of (b)

Acrylic-based copolymer+methacrylic acid monomer+photopolymerization initiator (weight ratio 1 to 2:1 to 2:0.1 to 0.2)

(4) Composition of Dielectric Material

Low melting point glass: vehicle=70 to 90:30 to 10 (weight ratio)

A process for manufacturing a layered construction of FIG. 4 will be described below:

First, a pasty electrode material is printed on the glass substrate 1 by a screen-printing method to form an electrode material layer 2 having the electrode pattern shape.

Subsequently, a pasty dielectric material is printed by a screen-printing method to form a dielectric material layer 6a.

A temperature of each material layer (2 and 6a) formed on the glass substrate 1 like this is gradually raised from room temperature to around 500° C. Upon rise in a temperature, a temperature raising profile of fixing a temperature at desirably thermal degradation temperatures (300° C., 350° C.) of binder resins, and softening points (450° C., 500° C.) of low melting point glasses for 10 to 15 minutes.

When a substrate temperature is raised and approaches around 300° C., the binder resin contained in the dielectric material layer 6a is initiated to be degraded into a gas, and the binder resin is released to the outside (reference No. 9a in the figure). Subsequently, when the temperature approached around 350° C., the binder resin contained in the electrode material layer 6a to be degraded. At this point, in the interior of the dielectric material layer 6a covering the electrode material layer 2, the binder resin has been degraded, and is not present, and only a powdery low melting point glass before initiation of softening is present. For this reason, when the binder resin contained in the electrode material layer 2 is degraded into a gas, this permeates through the interior of the dielectric material layer 6a and is discharged to the outside (reference No. 10a in the figure).

When a temperature is further raised, and approaches around 450° C., the low melting point glass contained in the dielectric material layer and, when the temperature approaches around 500° C., the low melting point glass contained in the electrode material layer are each softened, melted and sintered to vitrify, whereby the electrode, the dielectric layer and the rib which are adhered, are formed. When low melting point glasses are softened, since binder resins are not present, a gas is not fundamentally evolved. Therefore, a relationship between softening points of low melting point glasses may be reversed to this example, or may be the same.

By using the material for manufacturing of the present invention, an electrode and a dielectric layer can be formed by one time firing.

When the material for manufacturing a display panel substrate assembly of the present invention is used, a step of manufacturing a substrate assembly can be reduced and, as a result, working efficacy, large scale manufacturing efficacy and a yield can be improved.

What is claimed is:

1. A material for manufacturing a display panel substrate assembly having at least an electrode, an dielectric layer covering the electrode, and a rib formed on the dielectric layer on a glass substrate, the material comprising an electrode material containing an electrically conductive particle and a binder resin having a thermal degradation temperature of T1, a dielectric material containing a binder resin having a thermal degradation temperature T2 and a low melting point glass having a glass softening point Tb, and a rib material containing a binder resin having a thermal degradation temperature T3 and a low melting point glass having a glass softening point Tc, wherein the thermal degradation temperatures T1 to T3, and the glass softening points Tb and Tc have a relationship of T3<T2<T1<Tb and T3<Tc.

2. The material for manufacturing a display panel substrate assembly of claim 1, wherein the electrode material contains a low melting point glass having a glass softening point Ta, and the thermal degradation temperatures of T1 and T2 and the glass softening point Ta have a relationship of T2<T1<Ta.

3. The material for manufacturing a display panel substrate assembly of claim 2, wherein the glass softening points Ta and Tb have a relationship of Ta<Tb.

4. The material for manufacturing a display panel substrate assembly of claim 1, wherein the display panel substrate assembly is a front substrate assembly or a rear substrate assembly of a plasma display panel.

5. A process for manufacturing a display panel substrate assembly having an electrode on a glass substrate, a dielectric layer covering the electrode, and a rib formed on the dielectric layer, the process comprising:

forming an electrode material layer having a predetermined pattern on a glass substrate using an electrode material, forming a dielectric material layer using a dielectric material so as to cover the electrode material layer, forming a rib material layer having a predetermined pattern on the dielectric material layer using a rib material, and firing the glass substrate having the formed electrode material layer, the formed dielectric material layer and the formed rib material layer, to degrade binder resins contained in the electrode material layer, the dielectric material layer and the rib material layer, and to soften and sinter low melting point glasses, whereby, an electrode, a dielectric layer and a rib are formed at the same time by one time firing, wherein the electrode material contains an electrically conductive particle and a binder resin having a thermal degradation temperature of T1, the dielectric material contains a binder resin having a thermal degradation temperature T2 and a low melting point glass having a glass softening point Tb, the rib material contains a binder resin having a thermal degradation temperature T3 and a low melting point glass having a glass softening point Tc, and the thermal degradation temperatures T1 to T3 and the glass softening points Tb and Tc have a relationship of T3<T2<T1<Tb, and T3<Tc.

6. The process of claim 5, wherein temperature differences between T3 and T2, T2 and T1, T1 and Tb, and T3 and Tc are in a range of 20° C. to 50° C., respectively.

7. A process comprising:

forming an electrode material layer having a predetermined pattern on a glass substrate using an electrode material, forming a dielectric material layer using a dielectric material so as to cover the electrode material layer, forming a rib material layer having a predetermined pattern on the dielectric material layer using a rib material, and firing the glass substrate having the formed electrode material layer, the formed dielectric material layer and the formed rib material layer to degrade binder resins contained in the electrode material layer, the dielectric material layer and the rib material layer, and to soften and sinter low melting point glasses, to thereby form an electrode on the glass substrate, a dielectric layer covering the electrode and a rib on the dielectric layer, of a display panel substrate, at the same time by one time firing, wherein the electrode material contains an electrically conductive particle and a binder resin having a thermal degradation temperature of T1, the dielectric material contains a binder resin having a thermal degradation temperature T2 and a low melting point glass having a glass softening point Tb, the rib material contains a binder resin having a thermal degradation temperature T3 and a low melting point glass having a glass softening point Tc, the thermal degradation temperatures T1 to T3 and the glass softening points Tb and Tc have a relationship of T3<T2<T1<Tb, and T3<Tc.

* * * * *